Aug. 12, 1958  I. LIEBERMAN  2,847,627
REMOTE-CONTROL APPARATUS FOR POSITIONING A LOAD
Filed Jan. 5, 1956  2 Sheets-Sheet 1

INVENTOR:
ISADORE LIEBERMAN
BY
Karl F. Ross
AGENT

United States Patent Office 2,847,627
Patented Aug. 12, 1958

2,847,627
REMOTE-CONTROL APPARATUS FOR POSITIONING A LOAD

Isadore Lieberman, Brooklyn, N. Y., assignor to Novel Products Corp., New York, N. Y., a corporation of New York Application January 5, 1956, Serial No. 557,533

11 Claims. (Cl. 318—74)

The present invention relates to an apparatus for displacing a load by means of a follower member positioned at a distance from a control member and adapted to move in substantial synchronism with the latter.

Systems of this character are useful where the load to be controlled is positioned remote or otherwise inaccessible from the location of the (manually or automatically actuated) controller and/or where torques of greatly different magnitude are required to displace the controller and the load, respectively, so as to make it desirable to provide separate sources of motive power, e. g. electric motors, for both.

A principal object of this invention is to provide means for maintaining substantial synchronism between two or more power sources playing the part of a "leader" and a "follower," respectively, in order to insure that the posiiton of a load coupled with one of these sources corresponds as nearly as possible to that of a visual indicator or other movable element of a control device coupled with the other source.

A more specific object of the invention is to provide, in a system of the type referred to, means for limiting the maximum deviation between the positions of the load and of the controller to a predetermined angle of rotation which may be made as small as desired.

According to a feature of this invention there are provided a lead motor and a follower motor, preferably of the reversible type and of substantially constant speed, in combination with a first and a second set of contacts so controlled by these two motors, respectively, as to be alternately opened and closed when the corresponding motors are in motion. The speed ratio of the two motors is maintained within predetermined limits, generally such that the period of closure of the contacts controlled by the follower motor is at least equal to the open-circuit interval of the contacts controlled by the lead motor and is less than an entire operating cycle of the last-mentioned contacts. Moreover, the combined length of the periods of closure of both sets of contacts is preferably slightly longer than the combined length of their open-circuit intervals so that the lead motor, which is connected to be energized over both of these sets of contacts in parallel, will not be arrested as long as the two contact sets are approximately in step with each other. The two sets of contacts are normally operated in counterphase, i. e. each set is initially adjusted to open just before the other one closes, and this relationship will prevail as long as both motors operate in perfect synchronism. When a desired position has been reached, current is cut off from both the lead motor and the follower motor, causing the system to stop. It should be noted that either motor may be coupled to the load or to the controller determining the desired position of the load.

It is a further object of the invention to enable the system to operate substantially in the aforedescribed manner even if relatively cheap and simple motors (e. g. of the single-phase alternating-current or even of the direct-current type), not capable of running in precise synchronism, are used, so long as the speed deviation is held within the limits set forth above. If the contacts controlled by the lead motor operate faster than those controlled by the follower motor, a position will eventually be reached in which both sets of contacts are open simultaneously; thus the lead motor is temporarily de-energized while the follower motor, operated independently of these contacts, continues to run. As the follower motor recloses its contacts, the lead motor starts again and substantial synchronism is restored.

The contacts are preferably actuated by a disk entrained by the respective motor and provided with sectorial teeth which open and close the associated circuit either by camming action or by conductive engagement of a contact element. The angular width of these teeth determines the maximum deviation between the positions of the load and the controller at any stage of operation, taking into account any turn ratio other than unity between the disks and the load or the controller. Thus, if the disk coupled with the load motor is arranged to rotate several times the speed of the load, it will be possible to make the contactor teeth of these disks quite large without unduly increasing the margin of deviation.

The invention will be further described with reference to the accompanying drawing in which:

Fig. 3 is a generalized diagrammatic illustration of a system according to the invention using a plurality of stages in cascade, this system serving primarily as a torque converter.

Figure 1:
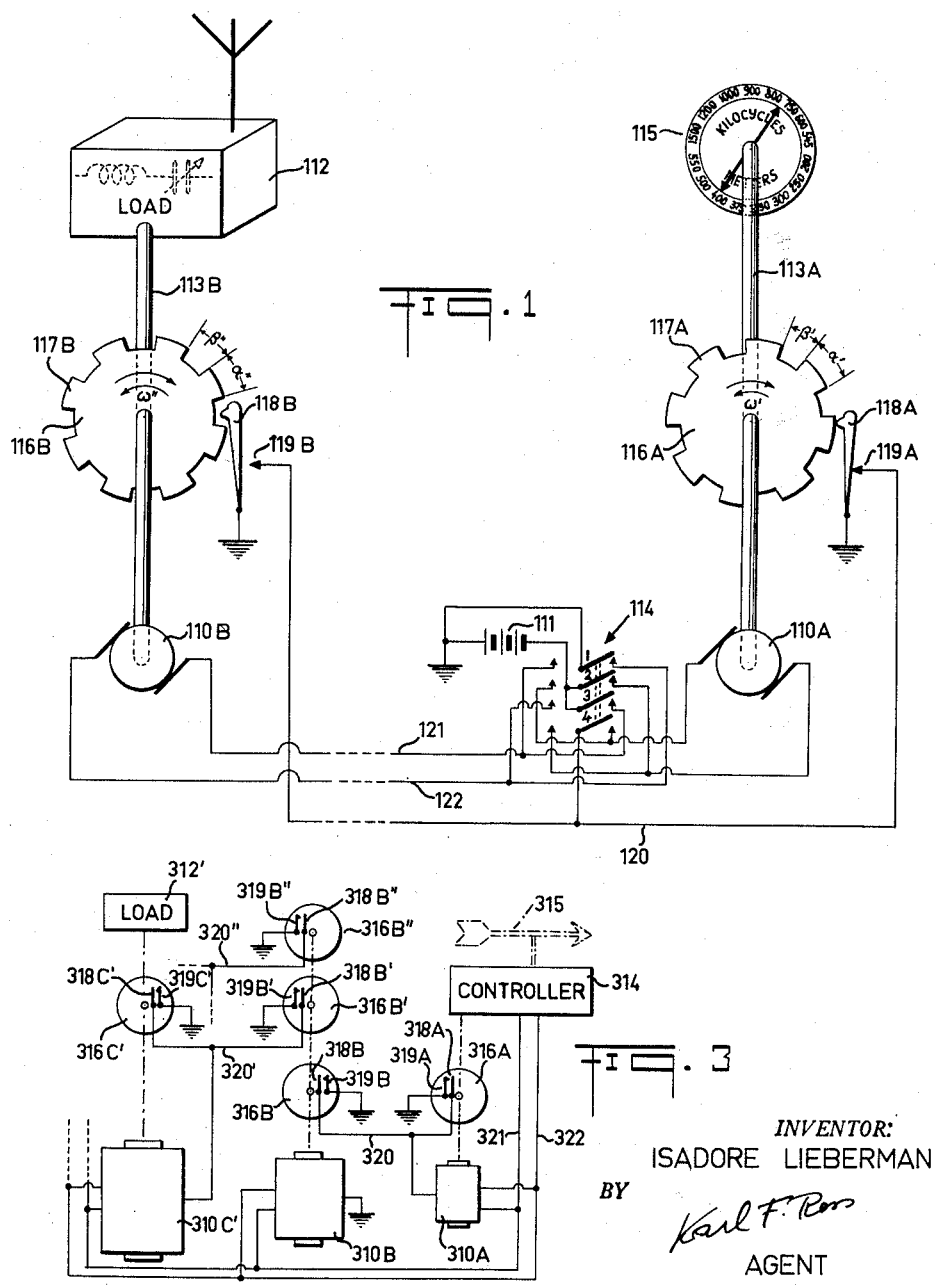
Fig. 1 is a somewhat diagrammatic illustration of an apparatus representing a first embodiment of the invention.

In Fig. 1 there are shown a first motor 110A and a second motor 110B adapted to be energized, over circuits to be described, from a source of current shown schematically as a battery 111. A load 112, which may be, for example, a tunable circuit of a radio receiver, is coupled with the shaft 113B of motor 110B for actuation in response to a controller which here comprises a manual switch 114 in combination with a visual indicator 115. Indicator 115 is entrained by the shaft 113A of motor 110A, this shaft also carrying a toothed disk 116A which is similar to a disk 116B carried by motor shaft 113B. The teeth 117A, 117B of disks 116A, 116B co-act with respective contact springs 118A, 118B having projections adapted to enter the spaces between adjacent disk teeth or to be cammed outwardly by these teeth so as to engage respective contact points 119A, 119B. In the starting position illustrated, the disks 116A, 116B are angularly offset from each other, as seen from the positions of the respective contact springs 118A, 118B, by the width of one disk tooth so that contacts 118A, 119A are closed while contacts 118B, 119B are open. Moreover, the configuration of the disk teeth and contact springs is such that the periods of contact closure will be slightly longer than the intervals of contact opening.

The switch 114 is shown to have four double-throw armatures of which armature No. 1 is connected to the grounded positive terminal of battery 111, armatures No. 2 and 3 are connected to the negative terminal of the battery and armature No. 4 is connected in parallel to contact points 119A, 119B via a conductor 120. Contact springs 118A and 118B are grounded. The right-hand input of motor 110A is connected to the right-hand contact of armature No. 2 and to the left-hand contact of armature No. 4; the left-hand input of motor 110A is connected to the right-hand contact of armature No. 4 and to the left-hand contact of armature No. 2; the right-hand input of motor 110B is connected via a conductor 121 to the right-hand contact of armature No. 3 and to the left-hand contact of armature No. 1; and the left-hand input of motor 110B is connected via a conductor 122 to the right-hand contact of armature No. 1 and to the left-hand contact of armature No. 3. Conductors 120, 121 and 122 may be part of a long line extending between controller 114, 115 and load 112.

The direction of current flow through the reversible motors 110A, 110B determines their sense of rotation. Also, these motors are so regulated that the speed of motor 110A will never be less than that of motor 110B and will never reach twice the speed of the latter motor. Since motor 110A thus has a tendency to run ahead of motor 110B, it will be termed the "lead motor"; motor 110B will be referred to as the "follower motor." Also, from the manner of their inclusion in the general system it will be possible to describe motor 110A as the control motor and motor 110B as the load motor; this relationship, however, may also be reversed as will become apparent from the subsequent description of Fig. 3.

The operation of the system of Fig. 1 is as follows:

Assume that the operator desires to change the tuning of the radio receiver 112 from a setting corresponding to the illustrated position of indicator 115 (750 kilocycles—400 meters) to a setting corresponding to, say, 545 kilocycles and 550 meters. Since the latter position can be reached most quickly by a movement in clockwise direction, the operator will throw switch 114 into engagement with its right-hand contacts whereby the following energizing circuits will be closed: Battery 111, No. 2 armature of switch 114, right-hand terminal of motor 110A, armature and left-hand terminal of that motor, No. 4 switch armature, conductor 120 to ground via contacts 118A, 119A; and battery 111, No. 3 armature of switch 114, conductor 121, right-hand terminal of motor 110B, armature and left-hand terminal of that motor, conductor 122 to ground on the No. 1 switch armature. Both motors are now traversed by current in a direction which we shall assume to result in their clockwise rotation.

With the disks 116A, 116B rotating clockwise from the position illustrated, and with motor 110A turning not slower and possibly slightly faster than motor 110B, contact spring 118A will step off the engaged disk tooth 117A and remove ground from conductor 120 before contacts 118B, 119B are closed, thus de-energizing the motor 110A. This enables motor 110B to catch up and to eliminate the slight residual deviation which had remained between the positions of load 112 and indicator 115 when the system had last been operated. When the arrival of the next tooth 117B cams spring 118B into contact-closing position, ground is reapplied to conductor 120 and motor 110A is restarted with a slight lag. The two disks 116A and 116B are now almost precisely in counterphase, the projection of spring 118A traversing the space between two teeth 117A before spring 118B steps off the engaged tooth 117B so that motor 110A remains operated as long as the closure periods of the two sets of contacts continue to overlap. As the motor 110A eliminates the lag and then again takes the lead over motor 110B, this overlap eventually ceases to exist and motor 110A is again de-energized until the original phase relationship is re-established. When the desired position of indicator 115 has been reached, the operator opens the switch 114 and both motors stop.

Had it been desired to move the indicator needle counter-clockwise, e. g. to a position of 1000 kilocycles and 300 meters, then the operator would have thrown switch 114 into its left-hand position and would have closed the following circuits: Battery 111; No. 2 armature of switch 114, left-hand terminal of motor 110A, armature and right-hand terminal of that motor, No. 4 switch armature, conductor 120 to ground via contacts 118A, 119A; and battery 111, No. 3 armature of switch 114, conductor 122, left-hand terminal of motor 110B, armature and right-hand terminal of that motor, conductor 121 to ground on the No. 1 switch armature. Both motors would then have been traversed by current in a direction assumed to result in their counterclockwise rotation. The operation of the disk contacts would have been the same as before.

It is to be understood, of course, that the inertia of the rotating units 110A, 116A, 115 and 110B, 116B, 112 should be so small as to reduce the aforementioned lag to a small fraction of a tooth width and to insure that neither disk will be carried by more than such fraction beyond the position in which its motor had been de-energized.

From the foregoing description it will be apparent that a certain excess in the effective width of the disk teeth over the effective width of their separations is desirable in order to minimize the rate of starts and stops of lead motor 110A; on the other hand, it will also be seen that the maximum relative deviation of the angular positions of the two disks is given by the sectoral division of each disk, i. e. by the angular distance between corresponding edges of adjacent disk teeth. If the widths of both sets of teeth and of their separations are substantially equal, as shown, the maximum relative deviation will be approximately equal to half the aforementioned angular distance. Such equality of widths is, however, not essential and the permissible range of relative motor speeds can in fact be increased, at the expense of greater maximum deviation for a given number of disk sectors, by reducing the spacing between the teeth of the lead disk, provided that certain limitations to be outlined below are observed.

Let $N'$ be the number of revolutions per second of motor 110A, $\omega' = 2\pi k' N'$ the angular velocity of disk 116A in radians per second where $k'$ is the transmission ratio (unity in Fig. 1) between the motor and the disk, $\alpha'$ the effective width of teeth 117A in radians, and $\beta'$ the effective width of the separations between these teeth in radians; further let $u' = \alpha'/\omega'$ be the time of closure and $v' = \beta'/\omega'$ the time of opening of the contacts 118A, 119A in seconds; and let $N''$, $\omega''$, $k''$, $\alpha''$, $\beta''$, $u''$ and $v''$ be the corresponding parameters for motor 110B and disk 116B.

For proper operation of the system it is then necessary that $u''$ be not less than $v'$, in order to enable spring 118A to be engaged by the next disk tooth 117A during closure of contacts 118B, 119B, and that $u''$ further be less than $u' + v'$ so that spring 118A cannot skip over an additional tooth separation during such closure. Also, since during closure of contacts 118B, 119B the lead motor 110A may outrun the follower motor 110B by as much as the width $\alpha'$ of a tooth 117A, it is necessary that $v'' : u'' \approx u' : v'$ in order to provide sufficient time for the system to fall back into step while the motor 110A is at rest. Substituting, we obtain the relationships $$(\alpha' + \beta')/\alpha'' > \omega'/\omega'' \geq \beta'/\alpha'' \qquad (1)$$

and $$\beta''/\alpha'' \approx \alpha'/\beta' \qquad (2)$$

The permissible speed ratio $N'/N'' = \omega' k''/\omega'' k'$ can be determined from inequality (1); its upper limit rises as $\alpha'$ is increased. The maximum load deviation (as read on indicator 115) corresponds, however, to the angular width $\alpha'$ or $\beta'$, whichever is greater, multiplied by the transmission ratio between the disk 116A and the indicator; from this viewpoint, therefore, the optimum condition is approximate equality between $\alpha'$ and $\beta'$, on the one hand, and between $\alpha''$ and $\beta''$, on the other hand. These four angular distances need not, however, be all equal to one another as will be described in connection with Fig. 2.

If the width of teeth 117A exceeds by a fraction $x$ the width which they should have to satisfy exactly Equation 2, in order to provide the desired overlap for smoother operation, then the numerator in the left-hand term of inequality (1) should be reduced by the value of $x$ to indicate a consequent reduction in the range of permissible speed ratios.

Figure 2:
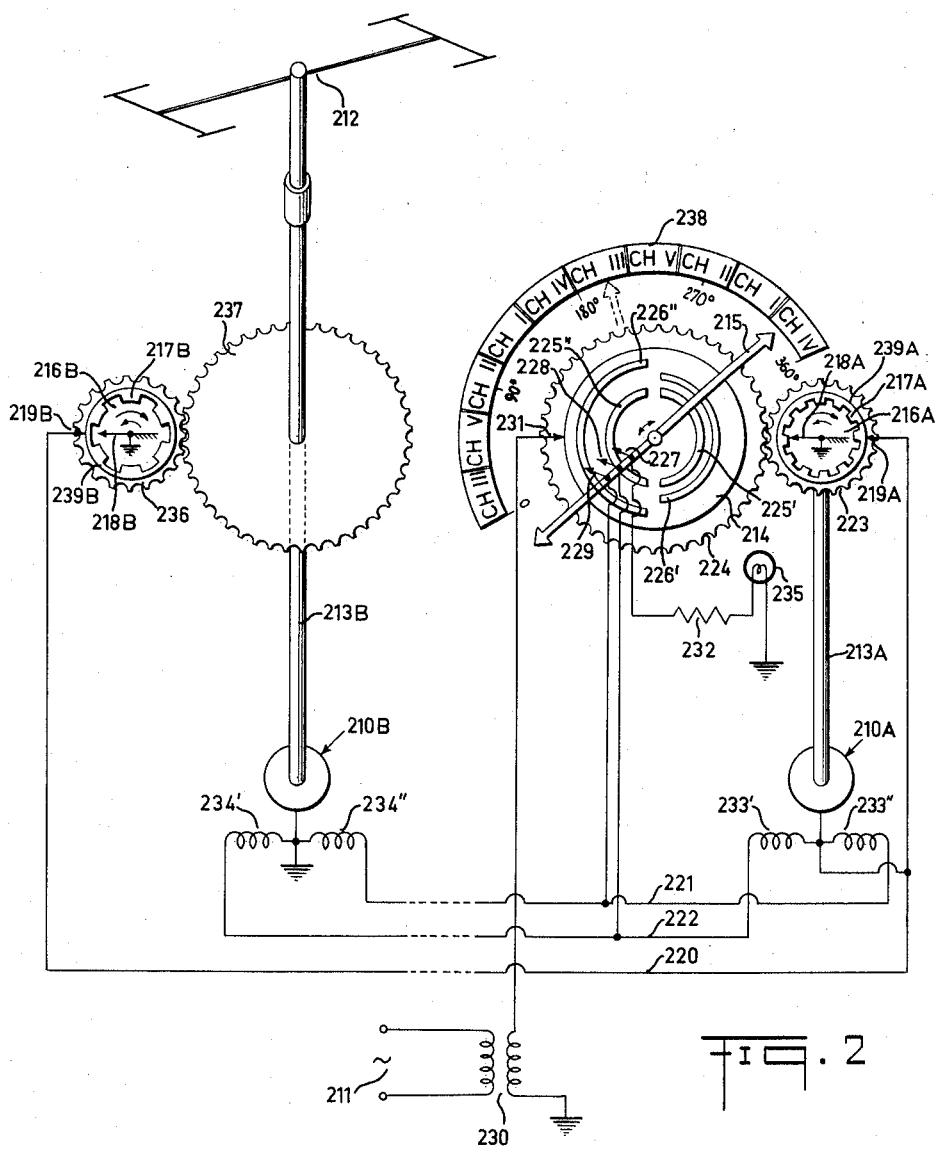
Fig. 2 is a similar illustration of an apparatus representing a second embodiment.

The system of Fig. 2 is generally similar to that of Fig. 1 but uses modified forms of contact disks 216A, 216B which are of insulating material and driven from respective alternating-current motors 210A, 210B. Disk 216A is positively coupled, by means of meshing gears 223, 224, with a metallic control disk 214 carrying two pairs of arcuate contact strips 225', 225" and 226', 226" Gear 224, if metallic and grounded, must be suitably insulated from disk 214. Strips 225', 225", separated by narrow, diametrically opposite gaps, are of like radius and are both engageable by a brush 227 carried on or forming part of an indicator member 215. Strip 226' is angularly coextensive with strip 225' and is engageable by a second brush 228 on member 215. Strip 226", being of slightly larger radius than strip 226', is angularly coextensive with strip 225" and is engageable by a third brush 229 on member 215.

A source 211 of alternating current works into the primary of a transformer 230 whose secondary is connected between ground and a wiper 231 permanently engaging disk 214. Brush 227 is connected to ground through a signal lamp 235 in series with a current-limiting resistor 232. Brush 228 is connected to a conductor 222 leading to the left-hand field windings 233' of motor 210A and 234' of motor 210B; brush 229 is connected to a conductor 221 leading to the right-hand field windings 233" of motor 210A and 234" of motor 210B.

Disk 216A, which is carried directly on the shaft 213A of motor 210A, is provided with a raised metal ring 239A forming inwardly facing teeth 217A positioned for engagement with a grounded wiper 218A. Disk 216B, which is positively coupled with the shaft 213B of motor 210B through meshing gears 236, 237, is similarly provided with a raised metal ring 239B forming inwardly facing teeth 217B positioned for engagement with a grounded wiper 218B. The turn ratio between disk 216B and shaft 213B is 2:1, hence the number of teeth 217B is half the number of teeth 217A and the width of the former is approximately twice that of the latter. Shaft 213B is coupled directly to a load 212, here shown as a directive (e. g. television) antenna.

The common junction of windings 233', 233" is connected to a conductor 220 leading to a pair of wipers 219A, 219B which are in permanent engagement with the metallic contact rings 239A, 239B on disks 216A, 216B, respectively. The common junction of windings 234', 234" is grounded.

The indicator member 215 is in the form of a double pointer co-operating with a scale member 238. Since the turn ratio between pointer 215 and shaft 213A is 1:2, a given angle of rotation of load 212 corresponds to half that angle for pointer 215. Thus, member 238 is graduated from 0° to 369° over a semicircle; also, since the load 212 is assumed to be a perfectly symmetrical antenna having identical reception in diametrically opposite positions, members 238 is further subdivided into two quadrants in which the same designations of television channels recur in a given order. If antenna 212 were asymmetrical, the calibration of scale 238 would of course be different. Pointer 215 may be regarded as a presettable selector co-operating with a follow-up member represented by disk 214.

The operation of the system of Fig. 2 is as follows:

Let us suppose that the television receiver (not shown) served by antenna 212 had previously been tuned to Channel III and that pointer 215 had been correspondingly positioned on the marking "CH III" to indicate a positioning of the antenna suitable for intercepting high-frequency waves from that channel. Let us further suppose that the operator, desirous of now receiving Channel IV instead, has just moved pointer 215 clockwise into register with the marking "CH IV," as shown.

Disk 214 is still in the position it occupied at the time when the system had previously come to rest, at which time the pointer 215 had been in the position shown in dot-dash lines and the brushes 227, 228, 229 had been disengaged from their respective contact strips.

Brush 227, upon engaging strip 225", causes lamp 235 to light in an obvious circuit, thereby indicating that the system is in the process of readjustment. Brush 228 remains out of contact with strip 226' but brush 229 engages strip 226", thereby connecting the secondary of transformer 230 to conductor 221 leading to the right-hand windings 233", 234" of motors 210A, 210B. Motor 210A is energized, in the position illustrated, in a circuit extending from winding 233" via wiper 219A, ring 239A, one of teeth 217A on disk 216A, wiper 218A to ground; motor 210B operates in parallel with motor 210A, it being assumed that energization of windings 233", 234" results in a counterclockwise rotation of shafts 213A, 213B. The fact that load 212 turns in a sense opposite to the displacement of indicator member 215 is immaterial since the operator here is guided by the markings on scale member 238 and not by the spatial relationship between the antenna and the pointer; were it necessary, the connections could of course be reversed.

The alternate opening and closing of the contacts 217A, 218A and 217B, 218B operates, in the manners described in connection with contact elements 117A, 118A and 117B, 118B of Fig. 1, to energize the lead motor 210A and the follower motor 210B until control disk 214 arrives in the position preselected with the aid of indicator member 215 in which brush 229 steps off contact strip 226" and disconnects transformer 230 from conductor 221. If the assembly entrained by motor 210A is of low inertia, and/or if it is provided with suitable damping means known per se, then the brushes will not overshoot the gap between the contact strips and no hunting will ensue. Lamp 235 is extinguished to signal that the system has come to rest.

The operator could also have selected the same or a different channel by rotating the pointer 215 counterclockwise from its previous position, in which case the left-hand windings 233', 233" would have been energized by way of conductor 222, brush 228 and contact strip 226'. The motors 210A, 210B would then have rotated in the opposite direction, otherwise there would have been no material difference in operation.

Fig. 3 shows an arrangement in which three motors 310A, 310B, 310C' are interconnected in a cascade arrangement. Motor 310A drives a disk 316A (which may be of the type shown in Fig. 1 or Fig. 2) provided with a pair of contacts 318A, 319A. Motor 310B drives a disk 316B, provided with contacts 318B, 319B, and a plurality of similar disks 316B', having contacts 318B', 319B', and 316B", having contacts 318B", 319B". Each of the last-mentioned disks controls a respective load of which only one, designated 312' and driven by motor 310C', has been illustrated; it will be understood that a companion motor, not shown, is controlled in analogous manner from disk 316B" and drives a separate load as well as a disk which is similar to disk 316C' driven by motor 310C', the contacts of the last-mentioned disk having been designated 318C', 319C'.

Contacts 319A, 319B, 319B', 319B" and 319C' are grounded. Contacts 318A and 318B are both connected to a conductor 320 leading to a neutral terminal of motor 310A, e. g. in the manner illustrated for motor 210A and conductor 220 in Fig. 2. Contacts 318B' and 318C' are similarly connected to a conductor 320' leading to a neutral terminal of motor 310C', an analogous conductor 320" being shown connected to contacts 318B". Each of motors 310A, 310B, 310C' has two inputs, one being connected to a conductor 321, the other to a conductor 322. Conductors 321, 322 extend toward a controller 314 which may be of a manual type, e. g. as shown in Fig. 2, or of an automatic type, e. g. as shown in Fig. 2, and which includes a source of electric current not shown. Motor 310B has a neutral terminal connected to ground.

The system of Fig. 3 may be used in an arrangement wherein multiple torque conversion is required, as where a low-power controller (e. g. a weathervane 315, as illustrated in dot-dash lines) is designed to operate a multiplicity of loads (such as, for example, one or more visual indicators and/or graphic recorders located at nearby or remote points) by way of an intermediate or distributor stage. In such case it may be desirable to have a rotating unit of low inertia as the first or controller stage, including a relatively small driving motor 310A therefor; a somewhat heavier unit as the intermediate stage, including a larger motor 310B driving the various distributor disks 316B', 316B''; and a still more powerful unit, represented by large motor 310C', coupled to each load at the final stage.

The operation of the system of Fig. 3 will be obvious from the previous description given in connection with Figs. 1 and 2. It may be mentioned, however, that as between the first two stages the lead motor 310A is coupled to the input and the follower motor 310B is coupled to the output, whereas with respect to the second and third stages the follower motor 310B controls the input and the lead motor 310C' controls the output or load. It will be remembered that in a system according to this invention the follower motor, whose circuit return (e. g. ground) is independent of the position of the motor shafts, must have a lower effective speed, taking into account the various transmission ratios as explained above, than the lead motor which is characterized by a circuit return controlled alternately by its own shaft and by the shaft of an associated follower motor. With the arrangement illustrated, all the contact disks will rotate in substantial synchronism until the system is de-energized by controller 314 upon reaching the position determined by indicator 315.

The invention is, of course, not limited to the specific embodiments described and illustrated but may be realized in various adaptations, modifications and combinations thereof without departing from the spirit and scope of the appended claims.

What is claimed is:

1. An apparatus for positioning a load, comprising a first and a second motor, first circuit-breaker means adapted to be periodically opened and closed by said first motor, second circuit-breaker means adapted to be periodically opened and closed by said second motor, a first energizing circuit for said first motor including both of said circuit-breaker means in parallel, a second energizing circuit for said second motor independent of both of said circuit-breaker means, control means including switch contacts for simultaneously opening and closing both of said energizing circuits, the speed ratio of said motors being such that the period of closure of said second circuit-breaker means is at least equal to the open-circuit interval of said first circuit-breaker means but less than a complete cycle of opening and closure of said first circuit-breaker means, and indicator means coupled with one of said motors, the other of said motors being coupled with said load.

2. An apparatus according to claim 1, wherein the combined length of the periods of closure of both of said circuit-breaker means is slightly greater than the combined length of the open-circuit intervals thereof.

3. An apparatus according to claim 1, wherein each of said motors is reversible, said first and second energizing circuits each including two branches for operating the respective motors in different directions, said switch contacts being selectively operable to close either of said branches.

4. An apparatus according to claim 1, wherein said indicator means comprises follow-up means entrainable by said one of said motors and presettable selector means movable relative to said follow-up means, said switch contacts being jointly controlled by said selector means and by said follow-up means and being adapted to maintain said energizing circuits closed in positions other than a limited number of predetermined relative positions of said selector and follow-up means.

5. An apparatus for positioning a load, comprising a first and a second motor, a first and a second rotatable contactor disk respectively entrained by said first and said second motor, a first set of contacts adapted to be periodically opened and closed by said first disk upon rotation thereof, a second set of contacts adapted to be periodically opened and closed by said second disk upon rotation thereof, a first energizing circuit for said first motor including both of said sets of contacts in parallel, a second energizing circuit for said second motor independent of both of said sets of contacts, and control means including switch contacts for simultaneously opening and closing both of said energizing circuits, the speed ratio of said motors being such that the period of closure of said second set of contacts is at least equal to the open-circuit interval of said first set of contacts but less than a complete cycle of opening and closure of the last-mentioned contacts, said control means including indicator means coupled with one of said motors, the other of said motors being coupled with said load.

6. An apparatus according to claim 5, wherein each of said disks is divided into sectors forming angularly spaced teeth adapted to open and to close the corresponding set of contacts.

7. An apparatus according to claim 6, wherein the angular width of said teeth slightly exceeds their relative spacing.

8. An apparatus according to claim 5, wherein said indicator means comprises a follow-up disk entrainable by said one of said motors and a presettable selector member movable relative to said follow-up disk, said switch contacts including cooperating contacts carried by said selector member and by said follow-up disk, respectively, and adapted to engage one another in off-normal relative positions thereof while being disengaged in a normal relative position.

9. An apparatus according to claim 8, further comprising signal means controlled by said cooperating contacts for indicating the occurrence of said off-normal relative positions.

10. An apparatus for positioning a load, comprising a plurality of stages each including a respective motor, indicator means coupled to the motor of the first stage, said load being coupled to the motor of the last stage, the motors of any pair of successive stages including a lead motor and a follower motor, a first energizing circuit for each lead motor, a second energizing circuit for each follower motor, and control means for simultaneously connecting power to and removing power from all of said energizing circuits according to the position of said indicator means; each lead motor being provided with rotatable first circuit-breaker means having contacts positioned to be periodically opened and closed by said lead motor, each follower motor being provided with rotatable second circuit-breaker means having contacts positioned to be periodically opened and closed by said follower motor, said first energizing circuit including the contacts of both of said circuit-breaker means connected to de-activate said lead motor in a plurality of angularly spaced relative positions of said circuit-breaker means, said second energizing circuit being independent of the contacts of both of said circuit-breaker means; the speed ratio of said motors being such that the period of closure of said second circuit-breaker means is at least equal to the open-circuit interval of said first circuit-breaker means but less than a complete cycle of opening and closure of the last-mentioned circuit-breaker means.

11. An apparatus according to claim 10, wherein said lead and follower motors are adapted to develop torques of different magnitude.

References Cited in the file of this patent

UNITED STATES PATENTS

| | | |
|---|---|---|
| 1,963,087 | Hay | June 19, 1934 |
| 2,406,853 | Richardson et al. | Sept. 3, 1946 |
| 2,433,920 | Yardeny | Jan. 6, 1948 |
| 2,440,838 | Yardeny | May 4, 1948 |
| 2,716,723 | King | Aug. 30, 1955 |
| 2,761,096 | Jeffers | Aug. 28, 1956 |